(12) United States Patent
Boué et al.

(10) Patent No.: US 12,001,485 B2
(45) Date of Patent: Jun. 4, 2024

(54) TECHNIQUES FOR ASSOCIATING DOMAIN-SPECIFIC TERMS FOR INFORMATION DISCOVERY

(71) Applicant: Microsoft Technology Licensing, LLC, Redmond, WA (US)

(72) Inventors: Laurent Boué, Petah Tikva (IL); Kiran Rama, Bangalore (IN)

(73) Assignee: Microsoft Technology Licensing, LLP, Redmond, WA (US)

( * ) Notice: Subject to any disclaimer, the term of this patent is extended or adjusted under 35 U.S.C. 154(b) by 49 days.

(21) Appl. No.: 17/826,927

(22) Filed: May 27, 2022

(65) Prior Publication Data

US 2023/0385340 A1 Nov. 30, 2023

(51) Int. Cl.
*G06F 17/00* (2019.01)
*G06F 16/903* (2019.01)
*G06N 3/08* (2023.01)

(52) U.S. Cl.
CPC ......... *G06F 16/90344* (2019.01); *G06N 3/08* (2013.01)

(58) Field of Classification Search
CPC ... G06F 16/90344; G06F 16/953; G06N 3/08; G06N 3/096
See application file for complete search history.

(56) References Cited

U.S. PATENT DOCUMENTS

| | | | | |
|---|---|---|---|---|
| 8,880,698 B2* | 11/2014 | Foster | ................... | G06F 16/164 709/226 |
| 11,068,655 B2* | 7/2021 | Yang | ................... | G06F 18/2155 |
| 2004/0030690 A1* | 2/2004 | Teng | ................... | G06F 16/9538 |
| 2009/0049028 A1* | 2/2009 | Senthil | .............. | G06F 16/90344 707/999.005 |
| 2015/0254353 A1* | 9/2015 | Gulwani | ............. | G06F 16/3344 707/706 |
| 2016/0239899 A1* | 8/2016 | Kamdar | ............. | G06Q 30/0629 |
| 2018/0024987 A1* | 1/2018 | Ganesalingam | ...... | G06F 40/242 704/9 |
| 2021/0049326 A1* | 2/2021 | Amend | ................. | G06F 40/232 |

OTHER PUBLICATIONS

McCallum, et al., "Building Domain-Specific Search Engines with Machine Learning Techniques", In Proceedings of the AAAI Spring Symposium on Intelligent Agents in Cyberspace, Mar. 22, 1999, 12 Pages.

"International Search Report and Written Opinion Issued in PCT Application No. PCT/US23/018232", dated Jun. 16, 2023, 11 Pages.

* cited by examiner

*Primary Examiner* — Greta L Robinson
(74) *Attorney, Agent, or Firm* — ArentFox Schiff LLP

(57) ABSTRACT

Described are examples for information discovery using domain-specific term matching, including obtaining, for a search session related to a domain, a set of search strings used for searching the domain for information discovery during the search session, identifying, for the search session, a string of the set of search strings as a search string hit and the remaining strings in the set of search strings as search string misses, and correlating, into a set of domain-specific search string misses, the remaining strings in the set of search strings with additional remaining search strings from one or more other search session related to the domain that have the same string identified as the search string hit.

20 Claims, 5 Drawing Sheets

TECHNIQUES FOR ASSOCIATING DOMAIN-SPECIFIC TERMS FOR INFORMATION DISCOVERY

BACKGROUND

Accurate discovery of information is becoming mainstream today as the amount of data available over the Internet and other systems has exponentially increased over past years, and continues to do so. This is prevalent both for searches on the Internet (e.g., referred to as "Site Search") as well as for "Domain-specific Search." In Site Search, for example, customers desiring to purchase a product use various online search and/or research mechanisms to find what they want before making a purchase. In Domain-specific Search, for example, engineering professionals use different ways to search for information they need. In another example of Domain-specific Search, technical support executives leverage online search to solve issues faced in troubleshooting problems. In this regard, Domain-specific Search can refer to a mechanism for finding information on specific domains, most commonly using a search bar of an external or internal website. When a search for a term provides a result of the term, this can be described as a "hit," whereas when no specific term is provided, this can be described as a "miss." Domain-specific search can include string matching, which also has information discovery applications in bioinformatics. The concept of similarity or approximate matching between strings is used in some site searches as one usually has to work with noisy data (e.g., typographical errors, different acceptable spellings, acronyms, numbering system, word ordering, and/or the like) in providing search results.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an example, a computer-implemented method for information discovery using domain-specific term matching is provided. The method includes a 'candidate generation step' that identifies the entities of the data matrix. Given a large # of combinations of all possible search terms, the candidate generation step can limit the combinations to a reasonable number bringing about improvements in time and speed and also in the eventual algorithm reducing sparsity to manageable levels. Candidate Generation can include obtaining, for a search session related to a domain, a set of search strings used for searching the domain for information discovery during the search session, identifying, for the search session, a string of the set of search strings as a search string hit and remaining strings in the set of search strings as search string misses, correlating, into a set of domain-specific search string misses, the remaining strings in the set of search strings with additional remaining search strings from one or more other search session related to the domain that have a same string identified as the search string hit, and providing the set of domain-specific search string misses along with the search string hits as the potential candidates to a machine learning (ML) model. The ML model can take the feature combinations based on string similarity of the candidates, a pair of candidates in each row, to build the model. This can provide the search string hit as output given an input of at least one search string miss of the set of domain-specific search string misses or an input string that is like the at least one search string miss. The ML model referenced can be a deep learning model, which can provide transfer learning and leveraging the learnings of a related domain to another domain.

In another example, a device for information discovery using domain-specific term matching is provided that includes a memory storing instructions, and at least one processor coupled to the memory. The at least one processor is configured to execute the instructions to obtain, for a search session related to a domain, a set of search strings used for searching the domain for information discovery during the search session, identify, for the search session, a string of the set of search strings as a search string hit and remaining strings in the set of search strings as search string misses, correlate as a candidate generation process, into a set of domain-specific search string misses, the remaining strings in the set of search strings with additional remaining search strings from one or more other search session related to the domain that have a same string identified as the search string hit, and provide the set of domain-specific search string misses along with the search string hit to a ML model that provides the search string hit as output given an input of at least one search string miss of the set of domain-specific search string misses or an input string that is similar to the at least one search string miss.

In another example, a computer-readable device is provided that stores instructions thereon that, when executed by at least one computing device, causes the at least one computing device to perform operations for information discovery using domain-specific term matching. The operations include obtaining, for a search session related to a domain, a set of search strings used for searching the domain for information discovery during the search session, identifying, for the search session, a string of the set of search strings as a search string hit and remaining strings in the set of search strings as search string misses, correlating as part of candidate generation process, into a set of domain-specific search string misses, the remaining strings in the set of search strings with additional remaining search strings from one or more other search session related to the domain that have a same string identified as the search string hit, and providing the set of domain-specific search string misses along with the search string hit to a ML model that provides the search string hit as output given an input of at least one search string miss of the set of domain-specific search string misses or an input string that is similar to the at least one search string miss.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
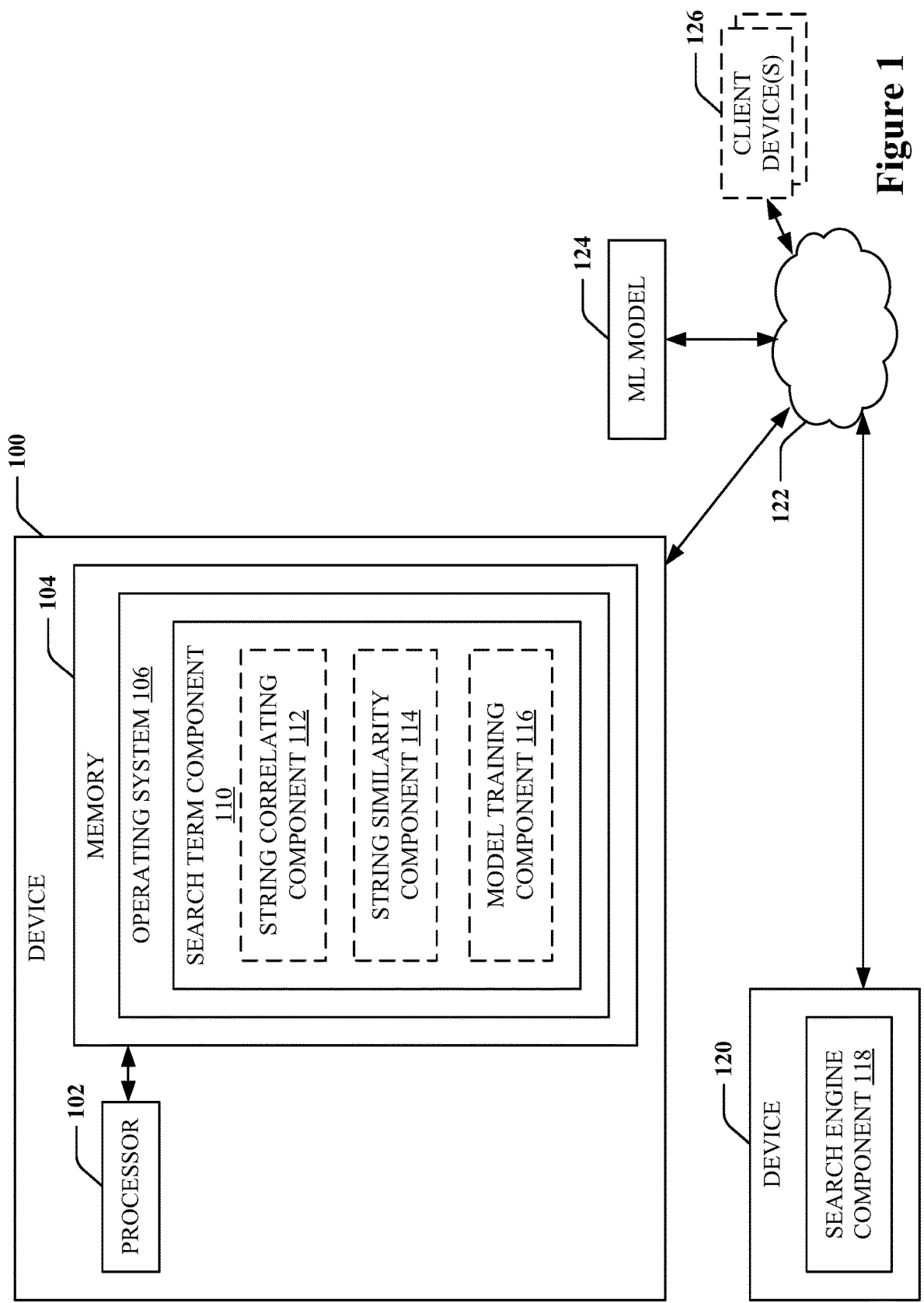
FIG. 1 is a schematic diagram of an example of a device for performing functions related to associating domain-specific terms for information discovery, in accordance with aspects described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form to avoid obscuring such concepts.

This disclosure describes various examples related to associating domain-specific terms for information discovery. In some examples, a data-driven machine learning (ML) mechanism can be provided for domain-specific string similarity scoring of terms. For example, string similarity can be formulated as a ML problem where the training dataset can be directly constructed considering the specificities of the domain. As described, string similarity can assist in associating search misses with the search hits In some domains, search sessions may be more prone to input of misspelled terms, as the terms may have a complex structure or spelling, such as a model number for a product, pharmaceutical name, a scientific, medical, or engineering term that may not have an intuitive spelling, etc. In this regard, for example, when a user inputs an incorrect search string (also referred to herein as a search string miss), this can be associated with the intended search string (also referred to herein as a search string hit) for providing corresponding search results, thus forgiving the error(s) in the input of the search string miss. Associating the search string misses with the search string hits such as by using string similarity, however, can be a difficult or time-consuming task. Considering $N_{vocab}$ words in the domain-specific vocabulary, which may include actual intended terms (search string hits) and misspellings (search string misses), the brute-force number of comparisons that should be labeled for a specific intended search string (e.g., as similar or not similar) can be $N_{vocab}(N_{vocab}-1)/2$, and this quadratic growth can quickly become impractical as $N_{vocab}$ grows.

Aspects described herein can provide for domain-specific search candidate generation of search string misses that are similar to a search string hit, which can reduce, for a given search string hit, the domain-specific vocabulary to evaluate in determining the similar search strings for the search string hit. For example, search string misses can be determined from multiple search sessions as the search terms used before a search string hit is detected. The search string misses can be correlated as similar search strings to the search string hit. This can be propagated over multiple search sessions to generate a list of search string misses that are deemed similar to the search string hit. String similarity can be used to generate a similarity metric for each search string in the list of search string misses as compared to the search string hit, thus greatly reducing the number of search strings considered in the string similarity process for the search string hit (e.g., reducing from the $N_{vocab}$ total number of strings searched using the domain-specific search).

For example, a set of k search sessions can be represented as $S=\{S_1, \ldots, S_k\}$ where each session $S_i=[(w_i^1,l_i^1), \ldots, (w_i^{n_i},l_i^{n_i})]$ records the $n_i$ tuples of (strings, labels) present in $S_i$, where the string is the search string, and the label is "hit" or "miss" or some indication thereof. In this example, considering a specific string w that is identified as a hit in a session, aspects described herein include grouping together all the other sessions in which w also appears as a hit and define $w_{gt}=w$ as the "ground-truth" or search string hit for this grouping. The other search strings gathered in this process can be identified as a search string miss, and/or can be tested against $w_{gt}$ (e.g., for similarity). Although the complexity of the algorithm may be $O(n^2)$, the pre-factor can be significantly reduced. In practice, only a very small subset of $N_{vocab}$ may need to be tested against each ground-truth. Accordingly, aspects described herein can use the activity recorded during the search sessions to efficiently generate a smaller set of potential candidates for search strings similar to the search string hit. Certain aspects relate to performing a candidate generation process, as described further herein, to achieve this end. A candidate generation process can identify the entities of a data matrix. For example, given a large number of combinations of all possible search terms, the candidate generation process, as described herein, can limit the combinations to a reasonable number bringing about improvements in time and speed and also in the eventual algorithm reducing sparsity to manageable levels.

In this example, the smaller set of search string misses can be used for similarity scoring using one or more similarity scoring algorithms. The smaller set of search string misses and similarity scores, along with the associated search string hit, can be provided as input vectors to an ML model for training the ML model to identify subsequent search string misses input into the domain-specific search as possibly intended to be the search string hit. Moreover, the ML model for one domain may be used to initialize weights for search strings for a ML model for another domain. In an example, the domains may be deemed as related for this purpose (e.g., domains in a similar technology area).

In an example, a candidate generation process can involve generating the reduced set of similar search string misses for the search string hit can greatly reduce the number of strings to consider in performing string similarity for the search string hit, training the ML model, using the ML model, etc. When the ML model is used in providing search results, in this regard, using the reduced set of similar search string misses may allow for a more efficient model, which may also have a more likely set of similar search string misses that have been used in past searches. This may improve the search results sent back to the user, which may improve user experience when using the domain-specific search feature.

Figure 2:
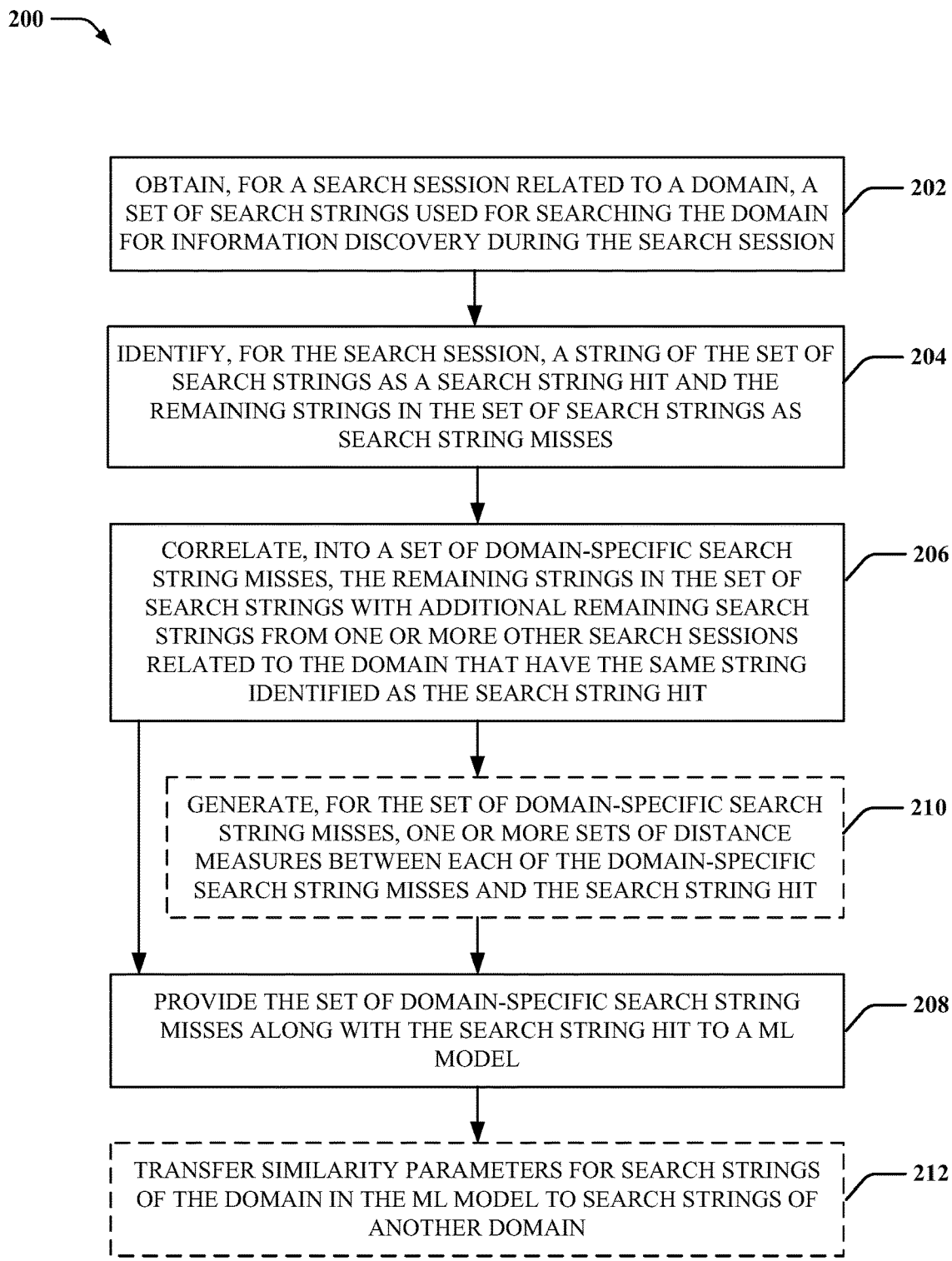
FIG. 2 is a flow diagram of an example of a method for associating domain-specific search terms for information discovery, in accordance with aspects described herein.
Figure 3:
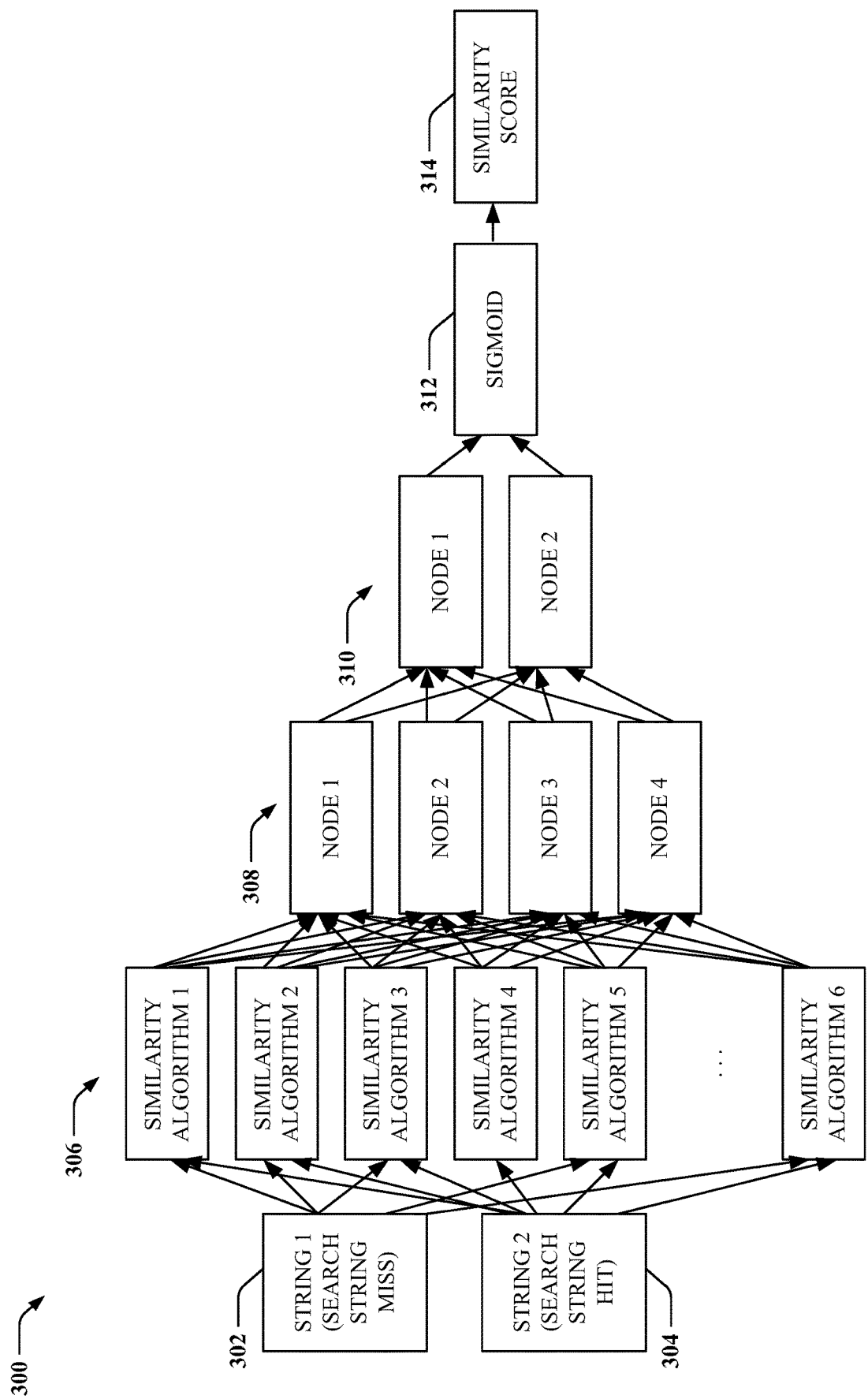
FIG. 3 illustrates an example of a process for using multiple string similarity algorithms to compute distance between strings, in accordance with aspects described herein.
Figure 4:
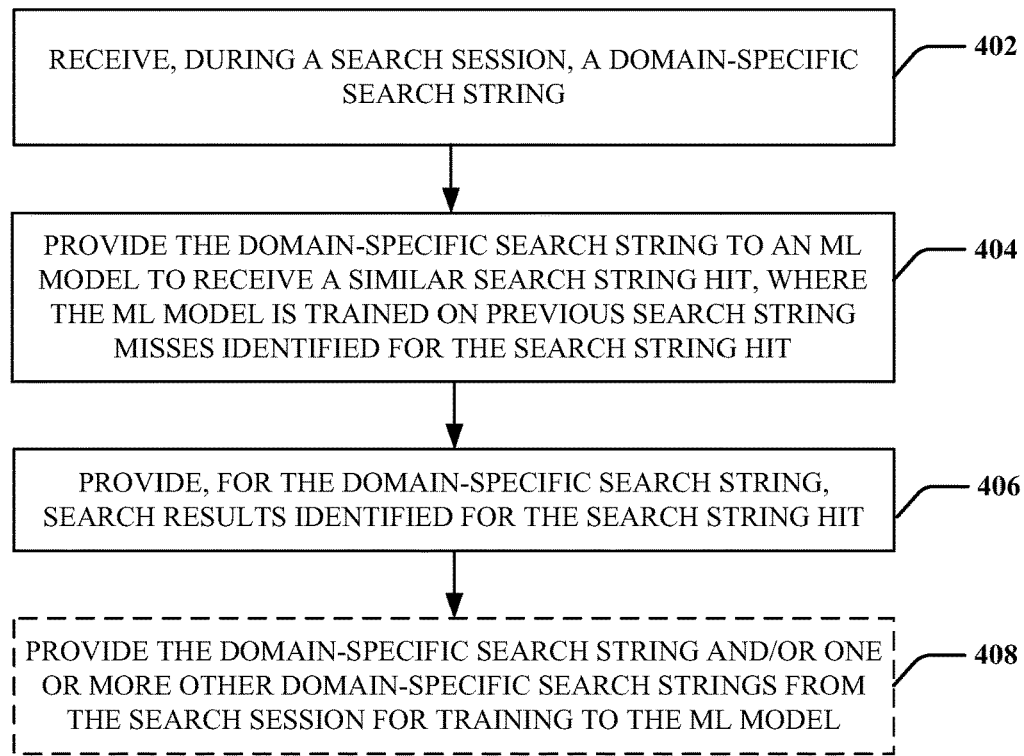
FIG. 4 is a flow diagram of an example of a method for using a machine learning model trained with associated domain-specific search terms for information discovery, in accordance with aspects described herein.

Turning now to FIGS. 1-5, examples are depicted with reference to one or more components and one or more methods that may perform the actions or operations described herein, where components and/or actions/operations in dashed line may be optional. Although the operations described below in FIGS. 2 and 4 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

FIG. 1 is a schematic diagram of an example of a device 100 (e.g., a computing device) for performing functions related to associating domain-specific terms for information discovery. In an example, device 100 can include a processor 102 and/or memory 104 configured to execute or store instructions or other parameters related to providing an operating system 106, which can execute one or more applications or processes, such as, but not limited to, a search term component 110 for associating domain-specific search terms to improve quality or performance of performing searches for search results using domain-specific search terms. For example, processor 102 and memory 104 may be separate components communicatively coupled by a bus (e.g., on a motherboard or other portion of a computing device, on an integrated circuit, such as a system on a chip (SoC), etc.), components integrated within one another (e.g., processor 102 can include the memory 104 as an on-board component), and/or the like. Memory 104 may store instructions, parameters, data structures, etc. for use/execution by processor 102 to perform functions described herein.

For example, search term component 110 can include a string correlating component 112 for correlating, associating, or otherwise matching search strings (also referred to herein as search terms) that are input into a search engine or otherwise determined as similar strings, a string similarity component 114 for computing, determining, or otherwise assigning a similarity score to certain search strings, and/or a model training component 116 for training an ML model based on the matched search strings for performing one or more functions, such as returning search results for correlated search strings, determining a similarity score for various search strings, etc. In an example, search term component 110 can correlate search terms for use by a search engine component 118, which may be part of device 100, or another device 120 (as illustrated) where devices 100 and 120 can communicate via one or more networks 122. Search engine component 118 can provide search results based on a search string input into an interface provided by the search engine component 118. In an example, search term component 110, as described herein, can be provided as an application or service that can execute or operating system 106, which can be made available as a product for purchase and install on a device that includes a search engine component 118, a product that executes in a cloud-based computing architecture to provide the described services for data on the cloud-based computing architecture, and/or the like.

As described, for example, in some domains, such as scientific domains, product-specific domains, etc., search terms can be more complex than common language terms, and as such may be more prone to typographical errors. As such, for example, search term component 110 can associate a set of search strings as similar to one another, such to provide the same or similar results for the set of search strings, where the set of search strings can include a correct (or ground truth) search string, also referred to herein as a search string hit, and one or more other similar search strings that may have one or more different characters or a different order of characters, etc., also referred to herein as a search string miss. Search engine component 118 can use the set of search strings to detect entry of a possibly incorrect search term that may be correlated with a search string hit, and can return search results for the search string hit for the incorrect search term. In one example, search term component 110 can train ML model 124 with the set of search strings. In this example, search engine component 118 can provide the search term as input to the ML model 124, and can receive, from the ML model 124, the search string hit as output. Search engine component 118 can then provide search results for the search string hit.

In addition, for example, one or more client devices 126 can access the search engine component 118 during a search session to perform the search for information discovery. In this example, the one or more client devices 126 can execute a domain-specific search (e.g., on a domain-specific website), including inputting a search term to search engine component 118. Search engine component 118, for example, can provide the search term to ML model 124 and can receive the search string hit. In one example, search engine component 118 can provide the search term to ML model 124 where a number of results for the search term does not achieve a threshold number. Search engine component 118 can receive the search string hit from the ML model 124, and can provide search results for the search string hit to the client device(s) 126.

During a search session, whether the results from the search string hit are provided or whether the search is executed with the original search term, a client device 126 may not select any of the returned search results and can instead execute another search with a different term. This process may continue until a suitable search result is located. In an example, search engine component 118 can provide, to the search term component 110, the one or more search strings acquired from the client device(s) 126 during the search session, where the last search term is deemed to be the search string hit. Search term component 110 can accordingly use the one or more search strings to further train the ML model 124 with similar strings for the search string hit. The list of hits and misses in a session can be used in the candidate generation process, as described further herein.

FIG. 2 is a flowchart of an example of a method 200 for associating domain-specific search terms for information discovery. For example, method 200 can be performed by a device 100 and/or one or more components thereof to facilitate associating the domain-specific search terms as input during a search session.

In method 200, at action 202, for a search session related to a domain, a set of search strings used for searching the domain for information discovery during the search session can be obtained. In an example, search term component 110, e.g., in conjunction with processor 102, memory 104, operating system 106, etc., can obtain, for the search session related to the domain, the set of search strings used for searching the domain for information discovery during the search session. For example, search term component 110 can obtain the set of search strings from a search engine component 118, which may execute on the same device 100 or another device 120. For example, search engine component 118 can provide search engine functionality to return search results for a query that indicates a search string. A client device 126, or a user accessing client device 126, can initiate a search session with the search engine component 118 by inputting a search string as a query for search results. The search session can continue, optionally with input of additional search strings, until a search result is accessed by the client device 126 (e.g., once the user selects a search result). The set of search strings input to the search engine component 118 for query until the search result is accessed can be associated as possibly similar strings, where the last entered search string can be considered or labeled as a ground truth or search string hit, while the other search strings can be considered or labeled as search string misses. In any case, for example, search engine component 118 can provide the set of strings to the search term component 110 for accordingly associating the search strings for improving subsequent searches.

In method 200, at action 204, a string of the set of search strings can be identified as a search string hit, and the remaining strings in the set of search strings can be identified as search string misses. In an example, string correlating component 112 of a search term component 110, e.g., in conjunction with processor 102, memory 104, operating system 106, etc., can identify, for the search session, the string of the set of search strings as the search string hit and the remaining strings in the set of search strings as search string misses. For example, as described, string correlating component 112 can identify a last string input during the search session as the search string hit, and can identify the previous zero or more strings input during the search session as search string misses. In an example, search term component 110 can receive the set of search terms in input order from the search engine component 118, based on which string correlating component 112 can determine the last string input.

In method 200, at action 206, the remaining strings in the set of search strings can be correlated into a set of domain-specific search string misses, with additional remaining search strings from one or more other search sessions related to the domain that have the same string identified as the search string hit. In an example, string correlating component 112 of a search term component 110, e.g., in conjunction with processor 102, memory 104, operating system 106, etc., can correlate, into the set of domain-specific search string misses, the remaining strings in the set of search strings with additional remaining search strings from one or more other search sessions related to the domain that have the same string identified as the search string hit. This can be part of a candidate generation process to generate a smaller set of search strings that may be possible string misses for a string hit that are gathered from multiple search sessions. For example, the one or more other search sessions can include a search session by the same client device 126 or associated user, and/or other client devices 126 or associated users. In an example, string correlating component 112 can correlate the search string misses from the search sessions with one another based on determining that the search sessions end with the same search string (e.g., the search sessions have the same ground truth or search string hit ending the search session by detecting selection of a corresponding search result).

In a specific non-limiting example of the candidate generation process, search term component 110 can receive a set of search strings from a first search session (e.g., a search session from a client device 126 accessing search engine component 118) with the following search strings: "string 1;" "string 2;" "string 3;" "string 4." Search term component 110 can also receive a set of search strings from a second search session with the following search strings: "string 5;" "string 6;" "string 4." In both search sessions, for example, the search session can end based on selection of a search result provided when searching for "string 4." As such, for example, "string 4" can be considered the ground truth or search string hit for both search sessions, and string correlating component 112 can accordingly correlate "string 1," "string 2," "string 3," "string 5," and "string 6," as search string misses for "string 4." In any case, for example, correlating the search string misses from multiple search sessions can quantify the similarity of the search string misses with the search string hit within a specific group, which can reduce the total vocabulary for subsequent processing.

In method 200, at action 208, the set of domain-specific search string misses along with the search string hit can be provided to an ML model. In an example, model training component 116 of a search term component 110, e.g., in conjunction with processor 102, memory 104, operating system 106, etc., can provide the set of domain-specific search string misses along with the search string hit to the ML model 124, which may be part of device 100 or stored on another device accessible via one or more networks 122. For example, model training component 116 can train the ML model 124 with the search string misses and the search string hit to allow the ML model 124 to provide a search string hit output where a search string miss input is provided, such as during one or more search sessions with search engine component 118, such to provide search results for the search string hit instead, as described above.

In one example in method 200, optionally at action 210, one or more sets of distance measures between each of the domain-specific search string misses and the search string hit can be generated for the set of domain-specific search string misses. In an example, string similarity component 114 of a search term component 110, e.g., in conjunction with processor 102, memory 104, operating system 106, etc., can generate, for the set of domain-specific search string misses, one or more sets of distance measures between each of the domain-specific search string misses and the search string hit. For example, string similarity component 114 can generate the one or more sets of distance measures using one or more string similarity algorithms. In this example, string similarity component 114 can also provide an output of the distance measures from the one or more string similarity algorithms, or some combination thereof such as an average or total distance measure, to the ML model 124 to improve the similarity association between the search string misses and the corresponding search string hit.

Generating the set of distance measured can be used or performed by the ML model as a ML algorithm, which may include transfer learning, as described herein (e.g., in reference to actions 208 and 212). For example, the one or more string similarity algorithms can include at least one of a Levenshtein algorithm, a character n-gram algorithm, a longest common subsequence algorithm, a Hamming distance algorithm, a Jaccard algorithm, a cosine similarity algorithm, a Jaro-Winkler algorithm, or a Damerau-Levenshtein algorithm. In an example, a Levenshtein algorithm can provide a distance as, or based on, a minimum number of transpositions required to make the two strings the same. In another example, a character n-gram algorithm can break a string into multiple shorter strings of length n. In another example, a longest common subsequence algorithm can provide the distance as the largest number of characters that are common to both strings. In another example, a Hamming distance algorithm can provide the distance between two strings as the minimum number of substitutions required to make the two strings the same. In another example, a Jaccard algorithm can measure an intersection over a union of two string sets. In another example, a cosine similarity algorithm can measure the similarity of two vectors by considering their normalized dot-product. In another example, a Jaro-Winkler algorithm can measured the edit distance between two vectors. In another example, a Damerau-Levenshtein algorithm can provide the distance as the Levenshtein distance with the transposition of adjacent symbols allowed.

This process describes the ML algorithm used in this case and this is a Deep Learning algorithm. The DNN aspects are trivial and not core to the claim. However the transfer learning component is part of our claim. FIG. 3 illustrates an example of a process 300 for using multiple string similarity algorithms to compute distance between strings. For example, string 1 302, which can be a search string miss, and string 2 304, which can be a search string hit, can be provided to one or more similarity algorithms 306, which can include one or more of the string similarity algorithms described above. Accordingly, for example, string similarity component 114 can use several distance measures between the candidate string pairs for each pair of search string miss to search string hit. The distance measures can be input into a ML model 124, as described, which may include a deep neural network (DNN). Where the input feature set can be denoted as X, each hidden layer in the DNN can apply a linear function followed by a non-linear activation function. For example, these functions can be performed to arrive at nodes 1-4 308 and/or nodes 1-2 310, respectively. In an example, the linear function can be represented as $W_k * X_{k-1}$, where k is the number of hidden layers, W represents the unknown weights, and X represents the inputs. In an example, the non-linear activation function can be represented by LeakyRelu that can have a form that:

$$\text{LeakyReLU}(X)=X \text{ if } X>0 \text{ and } 0.01X \text{ otherwise}$$

The forward pass of the DNN shown in FIG. 3 can be represented as:

$$\sigma(\text{LeakyReLU}(W_2*(\text{LeakyReLU}(W_1*X_1))+B_1))$$

where, in some examples, $X_0=X$. In an example, string similarity component 114 can find or determine the unknown weights by stochastic gradient descent. String similarity component 114, for example, can initialize the weights to random values and for every forward pass, and can compare the predicted values for the similarity (e.g., based on the distance measure) to the actual values, which in most cases can be the outputs of manual labeling (e.g., by an administrator or other user) or otherwise determined by an automated annotation exercise. For example, the actual value for the similarity may be based on presence of the one of the search string miss in a different search session for which the search string hit is determined. The computed loss can be backpropagated across the DNN to alter the weights, which can have been randomly initialized. In an example, string similarity component 114 can repeat this process across batches (e.g., a run through a subset of the input dataset) and across epochs (e.g., a run through the entire input dataset), until a convergence criterion is met (number of epochs, early stopping, etc.).

For example, though only two hidden layers are shown in FIG. 3, at nodes 1-4 208 and nodes 1-2 310, the DNN may have many hidden layers. For example, the DNN may have several layers corresponding to an architecture deemed to provide a certain quality of results, which may be tested after training. In any case, the process 300 may also include determining a sigmoid 312 from the last hidden layer, and/or translating the sigmoid 312 to a similarity score 314 between string 1 302 and string 2 304. String similarity component 114, for example, can store the similarity score in the ML model 124 as well, to improve the term matching for domain-specific terms in information discovery. In an example, the similarity score between a search string miss and a search string hit can be used in determining whether to provide the search string hit output based on receiving the search string miss as input.

Referring again to FIG. 2, in one example in method 200, optionally at action 212, similarity parameters for search strings of the domain in the ML model can be transferred to search strings of another domain. In an example, string similarity component 114 of a search term component 110, e.g., in conjunction with processor 102, memory 104, operating system 106, ML model 124, etc., can transfer similarity parameters for search strings of the domain in the ML model to search strings of another domain. For example, some domains may have similar domain-specific terms, such as medical domains, some engineering domains, etc. As such, for example, distance measures, weights for distance measures or other parameters within a ML mode (e.g., DNN), etc. for the domain can be transferred to another domain deemed to have similar domain-specific terms such to initialize the weights for that domain's ML model. For example, in a domain-specific search, there may be a DNN trained from the candidates generated from search for neurological medical terms. This DNN may be tested and developed on a large corpus of terms. There may be another topic related to neurology but a different medical domain with fewer corpus like related to genetic birth defects. The DNN for the latter can be initialized with the weights of the DNN of the former, and this is an example of how transfer learning can be leveraged for 'related' tasks.

In one specific example, weights determined as part of process 300 for training a DNN for one domain, e.g., weights W described above, can be used by a DNN for another domain at least for an initial weight determination. In any case, transferring the similarity parameters across domains, in this regard, can improve efficacy of the search string hit resulting from the search string miss. In addition, for example, model training component 116 can train the ML model for another domain using the transferred similarity parameters to improve the speed and/or accuracy at which the ML model is trained for this other domain.

FIG. 4 is a flowchart of an example of a method 400 for using a ML model trained with associated domain-specific search terms for information discovery. For example, method 400 can be performed by a device 120 and/or one or more components thereof to facilitate associating the domain-specific search terms as input during a search session.

In method 400, at action 402, a domain-specific search string can be received during a search session. In an example, search engine component 118, e.g., in conjunction with processor 102, memory 104, operating system 106, etc., can receive, during the search session, the domain-specific search string. For example, search engine component 118 can provide an interface, or can provide a backend for an application that provides an interface, which one or more client devices 126 can use to obtain search results for information discovery. As such, for example, search engine component 118 can receive, from the one or more client device 126, one or more search strings for searching during a search session. Search engine component 118 can provide, for a given search string, a list of search results to the client device 126, and the client device 126 may select a search result, initiate another search using a another search string, etc.

In method 400, at action 404, the domain-specific search string can be provided to an ML model to receive a similar search string hit, where the ML model is trained on previous search string misses identified for the search string hit. In an example, search engine component 118, e.g., in conjunction with processor 102, memory 104, operating system 106, etc., can provide the domain-specific search string to the ML model to receive the similar search string hit, where the ML model is trained on previous search string misses identified for the search string hit. In an example, search engine component 118 can determine whether to provide search results for the domain-specific search string or for the search string hit based on a number of search results for the domain-specific search string as input to the search engine component 118. For example, where search engine component 118 determines that the number of results for the domain-specific search string as input does not achieve a threshold (e.g., returns zero or only a few results), search engine component 118 may provide the domain-specific search string to the ML model 124 to determine whether a search string hit with high similarity or probability exists. If so, for example, search engine component 118 can instead return search results for the search string hit. In another example, search engine component 118 can provide the domain-specific search string to the ML model 124 regardless of a number of search results, and can determine to use a returned search string hit where the similarity or probability between the domain-specific search string as input and the search string hit achieves a threshold. In addition, for example, the ML model 124 can be a ML model that is trained as described above using history of search string misses from one or more search sessions.

In method 400, at action 406, search results identified for the search string hit can be provided for the domain-specific search string. In an example, search engine component 118, e.g., in conjunction with processor 102, memory 104, operating system 106, etc., can provide, for the domain-specific search string, the search results identified for the search string hit. For example, search engine component 118 can execute the search using the search string hit instead of the domain-specific search string as input by the client device 126, which assumes that the search string hit is the intended search sting and not the domain-specific search string as input, as described above. Search engine component 118 can provide the search results to client device 126 that requested the search using the domain-specific search term.

In method 400, optionally at action 408, the domain-specific search string and/or one or more other domain-specific search strings from the search session can be provided for training to the ML model. In an example, search engine component 118, e.g., in conjunction with processor 102, memory 104, operating system 106, etc., can provide the domain-specific search string and/or one or more other domain-specific search strings from the search session for training to the ML model 124. For example, search engine component 118 can provide the domain-specific search string and/or one or more other domain-specific search strings from the search session, as associated with the search string hit, to the search term component 110. Model training component 116 can further train the ML model 124 based on the domain-specific search string and/or one or more other domain-specific search strings from the search session. In an example, string similarity component 114 can additionally determine similarity scores for the domain-specific search string and/or one or more other domain-specific search strings from the search session and the correspond search string hit for additionally providing when training the ML model 124, as described above. In this regard, the ML model 124 can be continually refined based on search strings input from search sessions using a smaller set of search strings for a given search string hit to determine similar strings, instead of an entire vocabulary used for the domain-specific search.

Figure 5:
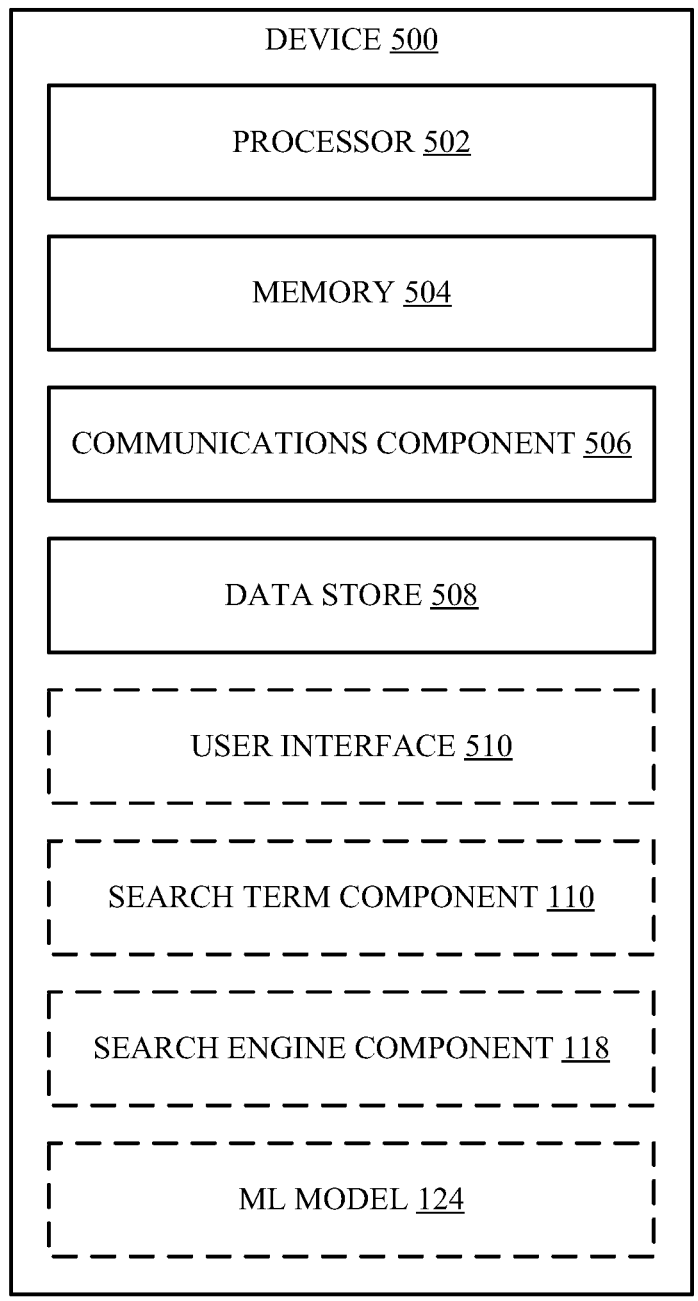
FIG. 5 is a schematic diagram of an example of a device for performing functions described herein, in accordance with aspects described herein.

FIG. 5 illustrates an example of device 500 including additional optional component details as those shown in FIG. 1. In one aspect, device 500 may include processor 502, which may be similar to processor 102 for carrying out processing functions associated with one or more of components and functions described herein. Processor 502 can include a single or multiple set of processors or multi-core processors. Moreover, processor 502 can be implemented as an integrated processing system and/or a distributed processing system.

Device 500 may further include memory 504, which may be similar to memory 104 such as for storing local versions of operating systems (or components thereof) and/or applications being executed by processor 502, such as a search term component 110, search engine component 118, ML model 124, etc. Memory 504 can include a type of memory usable by a computer, such as random access memory (RAM), read only memory (ROM), tapes, magnetic discs, optical discs, volatile memory, non-volatile memory, and any combination thereof.

Further, device 500 may include a communications component 506 that provides for establishing and maintaining communications with one or more other devices, parties, entities, etc. utilizing hardware, software, and services as described herein. Communications component 506 may carry communications between components on device 500, as well as between device 500 and external devices, such as devices located across a communications network and/or devices serially or locally connected to device 500. For example, communications component 506 may include one or more buses, and may further include transmit chain components and receive chain components associated with a wireless or wired transmitter and receiver, respectively, operable for interfacing with external devices.

Additionally, device 500 may include a data store 508, which can be any suitable combination of hardware and/or software, that provides for mass storage of information, databases, and programs employed in connection with aspects described herein. For example, data store 508 may be or may include a data repository for operating systems (or components thereof), applications, related parameters, etc.) not currently being executed by processor 502. In addition, data store 508 may be a data repository for a search term component 110, search engine component 118, ML model 124, and/or one or more other components of the device 500.

Device 500 may optionally include a user interface component 510 operable to receive inputs from a user of device 500 and further operable to generate outputs for presentation to the user. User interface component 510 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 510 may include one or more output devices, including but not limited to a display, a speaker, a haptic feedback mechanism, a printer, any other mechanism capable of presenting an output to a user, or any combination thereof.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly included and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A computer-implemented method for information discovery using domain-specific term matching, comprising:
    obtaining, for a search session related to a domain, a set of search strings used for searching the domain for information discovery during the search session;
    identifying, for the search session, a string of the set of search strings as a search string hit, based on selection of a search result returned for the string to end the search session, and remaining strings in the set of search strings as search string misses;
    correlating, into a set of domain-specific search string misses, the remaining strings in the set of search strings with additional remaining search strings from one or more other search session related to the domain that have a same string identified as the search string hit; and
    providing the set of domain-specific search string misses along with the search string hit to a machine learning (ML) model that provides the search string hit as output given an input of at least one search string miss of the set of domain-specific search string misses or an input string having a certain distance from the at least one search string miss that is computed using a string similarity algorithm.

2. The computer-implemented method of claim 1, further comprising:
    generating, for the set of domain-specific search string misses, one or more sets of distance measures between each of the domain-specific search string misses and the search string hit using one or more string similarity algorithms; and
    providing the one or more sets of distance measures to the ML model.

3. The computer-implemented method of claim 2, wherein the one or more string similarity algorithms include at least one of a Levenshtein algorithm, a character n-gram algorithm, a longest common subsequence algorithm, a Hamming distance algorithm, a Jaccard algorithm, a cosine similarity algorithm, a Jaro-Winkler algorithm, or a Damerau-Levenshtein algorithm.

4. The computer-implemented method of claim 2, wherein the ML model is a deep neural network (DNN).

5. The computer-implemented method of claim 4, wherein each of multiple layers of the DNN applies a linear function followed by a non-linear function to the one or more sets of distance measures.

6. The computer-implemented method of claim 5, wherein the linear function includes one or more weights determined by a stochastic gradient descent based on comparing a similarity predicted based on the distance measure to an actual similarity between a given one of the domain-specific search string misses and the search string hit.

7. The computer-implemented method of claim 6, wherein the actual similarity is based on presence of the given one of the domain-specific search string misses in a different search session for which the search string hit is determined.

8. The computer-implemented method of claim 6, wherein the DNN includes multiple domains including the domain, and wherein the DNN generates the one or more weights for the given one of the domain-specific search string misses based on one or more different domain weight for the given one of the domain-specific search string misses in a different domain of the multiple domains.

9. A device for information discovery using domain-specific term matching, comprising:
    a memory storing instructions; and
    at least one processor coupled to the memory and configured to execute the instructions to:
        obtain, for a search session related to a domain, a set of search strings used for searching the domain for information discovery during the search session;
        identify, for the search session, a string of the set of search strings as a search string hit, based on selection of a search result returned for the string to end the search session, and remaining strings in the set of search strings as search string misses;

correlate, into a set of domain-specific search string misses, the remaining strings in the set of search strings with additional remaining search strings from one or more other search session related to the domain that have a same string identified as the search string hit; and provide the set of domain-specific search string misses along with the search string hit to a machine learning (ML) model that provides the search string hit as output given an input of at least one search string miss of the set of domain-specific search string misses or an input string having a certain distance from the at least one search string miss that is computed using a string similarity algorithm.

10. The device of claim 9, wherein the at least one processor is configured to execute the instructions to:

generate, for the set of domain-specific search string misses, one or more sets of distance measures between each of the domain-specific search string misses and the search string hit using one or more string similarity algorithms; and provide the one or more sets of distance measures to the ML model.

11. The device of claim 10, wherein the one or more string similarity algorithms include at least one of a Levenshtein algorithm, a character n-gram algorithm, a longest common subsequence algorithm, a Hamming distance algorithm, a Jaccard algorithm, a cosine similarity algorithm, a Jaro-Winkler algorithm, or a Damerau-Levenshtein algorithm.

12. The device of claim 10, wherein the ML model is a deep neural network (DNN).

13. The device of claim 12, wherein each of multiple layers of the DNN applies a linear function followed by a non-linear function to the one or more sets of distance measures.

14. The device of claim 13, wherein the linear function includes one or more weights determined by a stochastic gradient descent based on comparing a similarity predicted based on the distance measure to an actual similarity between a given one of the domain-specific search string misses and the search string hit.

15. The device of claim 14, wherein the actual similarity is based on presence of the given one of the domain-specific search string misses in a different search session for which the search string hit is determined.

16. The device of claim 14, wherein the DNN includes multiple domains including the domain, and wherein the DNN generates the one or more weights for the given one of the domain-specific search string misses based on one or more different domain weight for the given one of the domain-specific search string misses in a different domain of the multiple domains.

17. A non-transitory computer-readable medium storing instructions thereon that, when executed by at least one computing device, causes the at least one computing device to perform operations for information discovery using domain-specific term matching, comprising:

obtaining, for a search session related to a domain, a set of search strings used for searching the domain for information discovery during the search session;

identifying, for the search session, a string of the set of search strings as a search string hit, based on selection of a search result returned for the string to end the search session, and remaining strings in the set of search strings as search string misses;

correlating, into a set of domain-specific search string misses, the remaining strings in the set of search strings with additional remaining search strings from one or more other search session related to the domain that have a same string identified as the search string hit; and providing the set of domain-specific search string misses along with the search string hit to a machine learning (ML) model that provides the search string hit as output given an input of at least one search string miss of the set of domain-specific search string misses or an input string having a certain distance from the at least one search string miss that is computed using a string similarity algorithm.

18. The non-transitory computer-readable medium of claim 17, wherein the operations further include:

generating, for the set of domain-specific search string misses, one or more sets of distance measures between each of the domain-specific search string misses and the search string hit using one or more string similarity algorithms; and providing the one or more sets of distance measures to the ML model.

19. The non-transitory computer-readable medium of claim 18, wherein the one or more string similarity algorithms include at least one of a Levenshtein algorithm, a character n-gram algorithm, a longest common subsequence algorithm, a Hamming distance algorithm, a Jaccard algorithm, a cosine similarity algorithm, a Jaro-Winkler algorithm, or a Damerau-Levenshtein algorithm.

20. The non-transitory computer-readable medium of claim 18, wherein the ML model is a deep neural network (DNN).

* * * * *